(12) United States Patent
Onishi

(10) Patent No.: US 10,432,815 B2
(45) Date of Patent: Oct. 1, 2019

(54) INFORMATION PROCESSING APPARATUS THAT TURNS ON WHEN SENSING A HUMAN AND TURNS OFF WHEN NO OPERATION IS INPUT IN A PREDETERMINED TIME, METHOD OF CONTROLLING THE SAME, AND STORAGE MEDIUM

(71) Applicant: CANON KABUSHIKI KAISHA, Tokyo (JP)

(72) Inventor: Tetsuya Onishi, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/847,012

(22) Filed: Dec. 19, 2017

(65) Prior Publication Data

US 2018/0176404 A1 Jun. 21, 2018

(30) Foreign Application Priority Data

Dec. 20, 2016 (JP) ................. 2016-247011

(51) Int. Cl.
| | |
|---|---|
| *H04N 1/00* | (2006.01) |
| *G06F 1/3296* | (2019.01) |
| *G06F 1/3231* | (2019.01) |
| *G06F 3/12* | (2006.01) |
| *G06F 1/3287* | (2019.01) |

(52) U.S. Cl.
CPC ....... *H04N 1/00896* (2013.01); *G06F 1/3231* (2013.01); *G06F 1/3287* (2013.01); *G06F 1/3296* (2013.01); *G06F 3/1221* (2013.01); *G06F 3/1229* (2013.01); *H04N 2201/0094* (2013.01)

(58) Field of Classification Search
CPC ..... G06F 1/3231; G06F 1/3206; G06F 1/3203
See application file for complete search history.

(56) References Cited

U.S. PATENT DOCUMENTS

| | | | |
|---|---|---|---|
| 9,152,209 B2 * | 10/2015 | Jeong | G06F 1/3228 |
| 9,170,539 B2 | 10/2015 | Okuzono | |
| 9,459,576 B2 | 10/2016 | Okuzono | |
| 9,678,559 B1 * | 6/2017 | Devries | G06F 1/3265 |

(Continued)

FOREIGN PATENT DOCUMENTS

JP 2015-005905 A 8/2015

*Primary Examiner* — Nicholas Pachol
(74) *Attorney, Agent, or Firm* — Venable LLP

(57) ABSTRACT

An information processing apparatus according to the present embodiment has, as operation modes, a normal operation power mode and a power-saving mode in which power consumption is lower than that of the normal operation power mode. The apparatus comprises a human detection sensor which is able to detect a user of the information processing apparatus. The apparatus shifts, based on a detection result of the human detection sensor, the operation mode of the information processing apparatus from the second power mode to the first power mode, and determines whether or not to shift the operation mode of the information processing apparatus to the second mode based on a detection result of the human detection sensor when a first predetermined time period has elapsed without receiving a user operation after shifting the operation mode to the first power mode.

11 Claims, 14 Drawing Sheets

(56) References Cited

U.S. PATENT DOCUMENTS

| | | | |
|---|---|---|---|
| 2012/0326038 A1* | 12/2012 | Yamashina | G03G 15/5004 250/338.3 |
| 2013/0073887 A1* | 3/2013 | Miki | G06F 1/3231 713/323 |
| 2013/0300874 A1* | 11/2013 | Aoshima | H04W 52/0254 348/158 |
| 2014/0063528 A1* | 3/2014 | Hirose | H04N 1/00323 358/1.13 |
| 2014/0376941 A1 | 12/2014 | Okuzono | |
| 2015/0237228 A1* | 8/2015 | Okuzono | G06K 15/406 358/1.13 |
| 2015/0261168 A1* | 9/2015 | Yokoyama | G03G 15/80 399/81 |
| 2016/0011552 A1 | 1/2016 | Okuzono | |
| 2016/0142576 A1* | 5/2016 | Yamaguchi | H04N 1/00891 358/1.13 |
| 2016/0333474 A1 | 11/2016 | Okuzono | |
| 2017/0116104 A1* | 4/2017 | Abou Mahmoud | G06F 11/34 |
| 2017/0244856 A1* | 8/2017 | Narushima | G06F 1/3231 |
| 2018/0176404 A1* | 6/2018 | Onishi | H04N 1/00896 |

\* cited by examiner

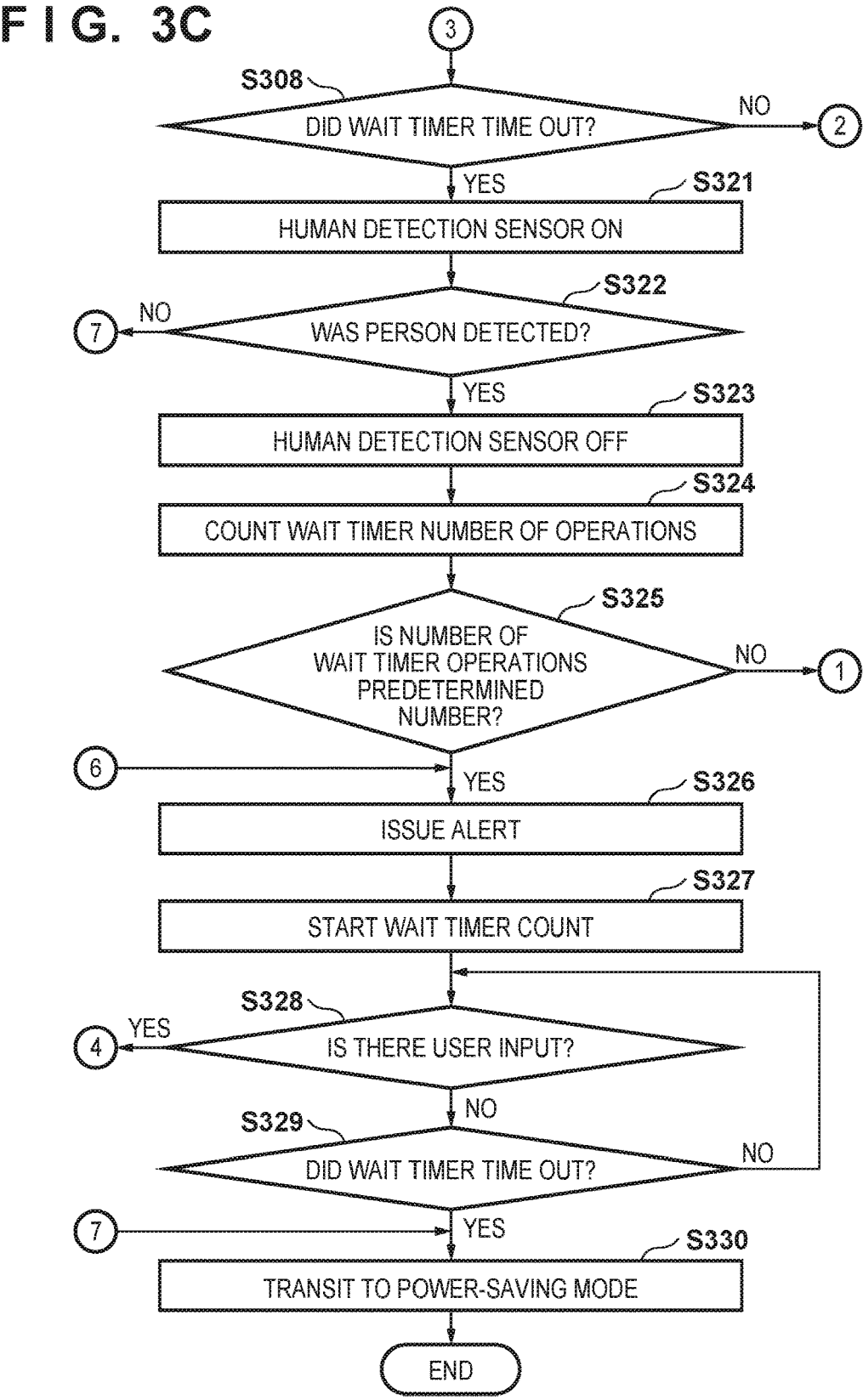

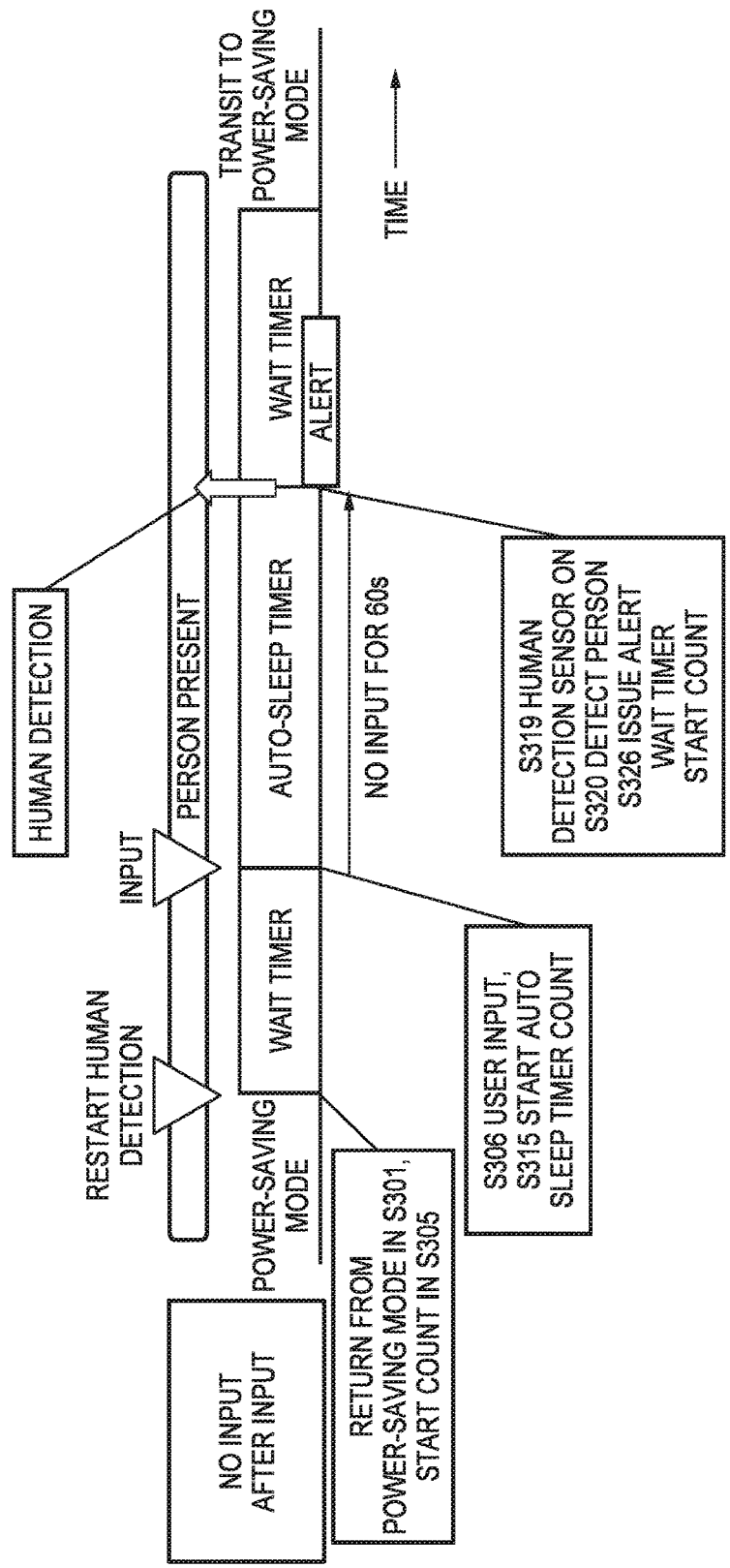

INFORMATION PROCESSING APPARATUS THAT TURNS ON WHEN SENSING A HUMAN AND TURNS OFF WHEN NO OPERATION IS INPUT IN A PREDETERMINED TIME, METHOD OF CONTROLLING THE SAME, AND STORAGE MEDIUM

BACKGROUND OF THE INVENTION

Field of the Invention

The present invention relates to an information processing apparatus that uses a sensor to detect an approach of a person, and then changes a power mode of the apparatus, a method of controlling the same, and a storage medium.

Description of the Related Art

There are recent apparatuses in which a human detection sensor function that detects a human body positioned in the vicinity of the apparatus, and distinguishes a user that will use the apparatus is implemented. By a design in which, in a case where a user that will use the apparatus is distinguished, a normal mode is returned to automatically from a power-saving mode, and the speed of return is improved. For example, in Japanese Patent Laid-Open No. 2015-005905 is disclosed an image forming apparatus that, after returning to a normal mode upon a detection by a human detection sensor, transits into a power-saving mode in a case where the user moves away from the apparatus without performing input.

However, there is a problem as is recited below in the foregoing conventional technique. For example, in a case where no input is performed after the automatic return according to the human detection sensor, it is difficult to distinguish a return due to a misdetection when a passerby passes in front of the apparatus and a user who is wavering over what input to perform. In a case of a misdetection, power is consumed unnecessarily. In the foregoing conventional technique, in the case where a user ceases to be detected, control is performed to transit into the power-saving mode based on job execution status, in order to reduce unnecessary power consumption.

However, in the foregoing conventional technique, power is consumed unnecessarily when the power-saving mode is not transited into while the human detection sensor detects a person even when a user does is not attempting to input. Meanwhile, control can be considered in which the power-saving mode is automatically transited into if, after automatic return according to the human detection sensor, no input is performed for a fixed time period. However, in such control, in a case where it is not a misdetection, if the user is wavering over what input to perform, there is the possibility that the power-saving mode will be automatically transited into when the user intends to input, for example, which the user will consider bad in terms of usability.

SUMMARY OF THE INVENTION

The present invention enables realization of a mechanism which, after returning from the power-saving mode upon detection by a human detection sensor, suitably avoids transiting into a power-saving mode against the will of the user in a case where there is not a misdetection, while reducing unnecessary power consumption according a misdetection by the human detection sensor.

One aspect of the present invention provides an information processing apparatus having, as operation modes, a first power mode and a second power mode in which power consumption is less than that of the first power mode, the apparatus comprising: a human detection sensor which is able to detect a user of the information processing apparatus; a shift unit configured to, based on a detection result of the human detection sensor, shift the operation mode of the information processing apparatus from the second power mode to the first power mode; and a determination unit configured to determine whether or not to shift the operation mode of the information processing apparatus to the second mode based on a detection result of the human detection sensor when a first predetermined time period has elapsed without receiving a user operation after shifting the operation mode to the first power mode.

Another aspect of the present invention provides a method of controlling an information processing apparatus having a human detection sensor which is able to detect a user of the information processing apparatus, and, as operation modes, a first power mode and a second power mode in which power consumption is less than that of the first power mode, the method comprising: based on a detection result of the human detection sensor, shifting the operation mode of the information processing apparatus from the second power mode to the first power mode, and determining whether or not to shift the operation mode of the information processing apparatus to the second mode based on a detection result of the human detection sensor when a first predetermined time period has elapsed without receiving a user operation after shifting the operation mode to the first power mode.

Still another aspect of the present invention provides a computer-readable storage medium storing a computer program for causing a computer to execute each step of a method of controlling an information processing apparatus having a human detection sensor which is able to detect a user of the information processing apparatus, and, as operation modes, a first power mode and a second power mode in which power consumption is less than that of the first power mode, the method comprising: based on a detection result of the human detection sensor, shifting the operation mode of the information processing apparatus from the second power mode to the first power mode, and determining whether or not to shift the operation mode of the information processing apparatus to the second mode based on a detection result of the human detection sensor when a first predetermined time period has elapsed without receiving a user operation after shifting the operation mode to the first power mode.

Further features of the present invention will be apparent from the following description of exemplary embodiments with reference to the attached drawings.

BRIEF DESCRIPTION OF THE DRAWINGS

FIGS. 3A-3C are views that illustrates a power-supply control flow of the image processing apparatus according to an embodiment.

FIG. 12 is a view for describing a situation in which after an input by a user is performed on the image processing apparatus according to an embodiment, a state in which no input is performed continues.

DESCRIPTION OF THE EMBODIMENTS

Preferred embodiments of the present invention will now be described in detail with reference to the drawings. It should be noted that the relative arrangement of the components, and the numerical expressions and numerical values set forth in these embodiments do not limit the scope of the present invention unless it is specifically stated otherwise.

<Image Forming Apparatus Schematic Configuration>

Figure 1:
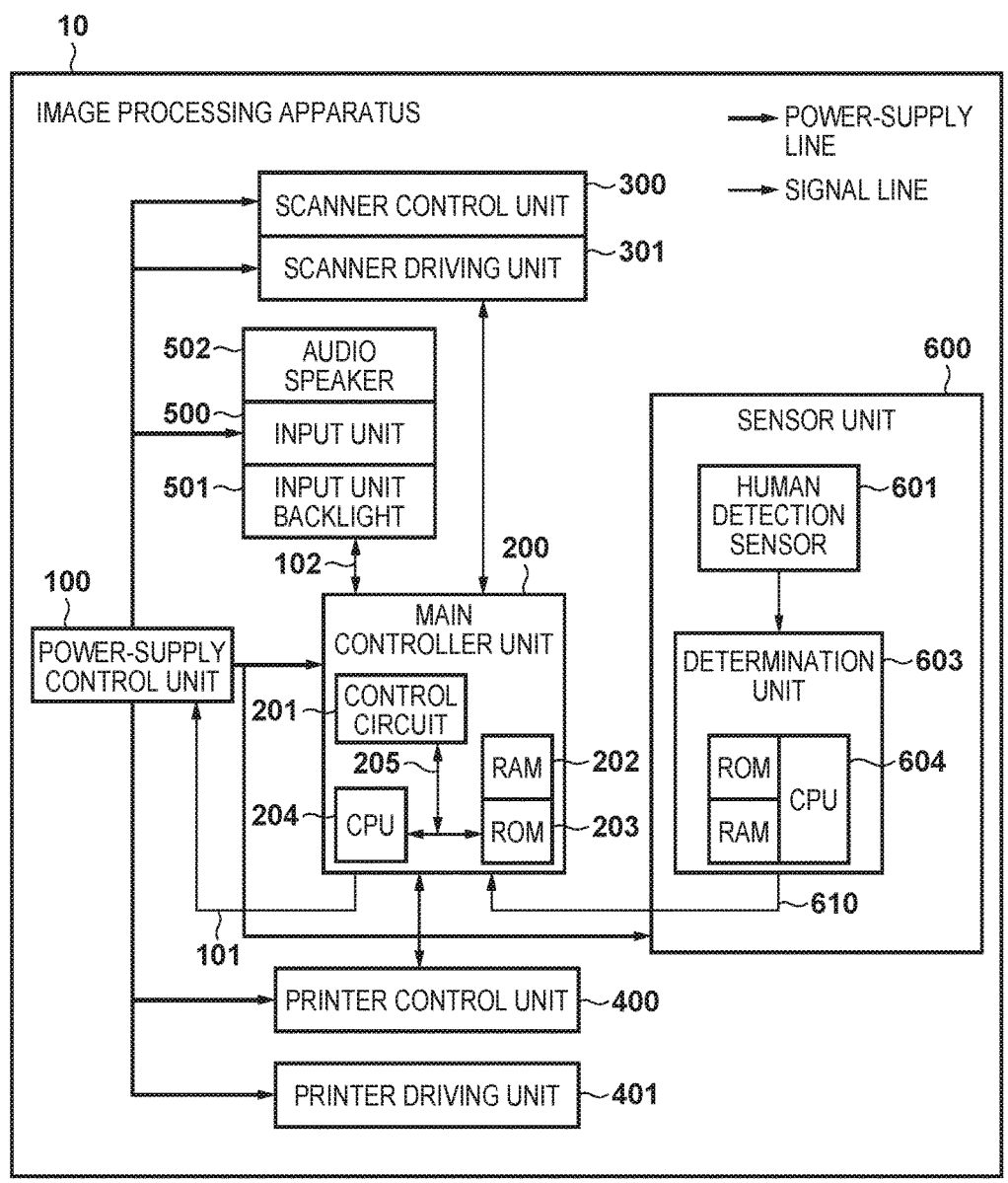
FIG. 1 is a block diagram of an image processing apparatus according to an embodiment.

Below, an embodiment of the present invention will be described. Firstly, with reference to FIG. 1, a configuration of an image processing apparatus which is an example of an information processing apparatus according to the present invention will be described.

An image processing apparatus 10 comprises a power-supply control unit 100, a main controller unit 200, a scanner control unit 300, a scanner driving unit 301, a printer control unit 400, a printer driving unit 401, an input unit 500, and a sensor unit 600. The power-supply control unit 100 controls supply of power to each device in the apparatus. The main controller unit 200 comprehensively controls the apparatus as a whole.

The scanner control unit 300 comprehensively controls an operation for reading an image from an original, and processes image data when an image is read. The scanner driving unit 301 drives a scanner (not shown) in accordance with an instruction by the scanner control unit 300. The printer control unit 400 comprehensively controls operations to form an image on a sheet in accordance with image data, and processes image data. The printer driving unit 401 drives a printer (not shown) in accordance with an instruction by the printer control unit 400.

The input unit 500 is a user interface comprising a touch panel type display unit and input unit, and comprises an input unit backlight 501 in the display unit and an audio speaker 502.

The image processing apparatus 10 has at least two power modes: a normal operation power mode (first power mode) in which copy operations are executed and a power-saving mode (second power mode) in which power consumption is lower than in the normal operation power mode. Description will be given later, but in a case where the apparatus is not used even though a fixed time period in accordance with timing by an auto-sleep timer (second timing unit) has elapsed, the main controller unit 200 controls the power-supply control unit 100 and causes the power mode of the apparatus to transit to the power-saving mode. During the power-saving mode, supply of power to the scanner control unit 300 and the printer control unit 400 is stopped, and supply of power to part of the main controller unit 200 and to unnecessary portions in the input unit 500 is stopped.

Details of the sensor unit 600 will be described later, but as is described in FIG. 6, power is supplied to the sensor unit 600 of the apparatus during the power-saving mode. Meanwhile, it is possible to stop supply of power to the sensor unit 600 when the normal operation power mode is transited into. Also, configuration may be taken so as continuously supply power to the sensor unit 600, and to mask the later-described energization request signal 610 within the main controller unit 200 when the normal operation power mode is transited into. The power supply of these is controlled by the power-supply control unit 100 and the main controller unit 200.

The sensor unit 600 comprises a human detection sensor 601 and a determination unit 603, and detects a person positioned in the vicinity of the image processing apparatus 10. The human detection sensor 601 has a fixed detection range, and may be an ultrasonic sensor, a pyroelectric sensor, an infrared array sensor, or the like. The determination unit 603 detects whether or not an object (person) is in the detection range of the human detection sensor based on output of the human detection sensor 601. The determination unit 603 internally comprises a CPU 604 which is a one-chip microcomputer, a ROM for storing a program, and a RAM used as a work area.

The CPU 604 performs processing for measuring a distance to a person by removing surplus noise from a signal obtained from the human detection sensor 601 based on the program stored in the ROM. The result of this is that it becomes possible to more accurately output the energization request signal 610 to the main controller unit 200. The determination unit 603 processes the result of detection by the human detection sensor 601 to determine whether a user is present, and outputs the energization request signal 610 to the main controller unit 200 in accordance with the determination result. The processing of the CPU 604 is not a main element of the invention and so detailed description is omitted.

In the main controller unit 200, a CPU 204 which controls the image processing apparatus 10 as a whole, a ROM 203 which stores programs, and a work RAM 202 are connected by a control bus 205. The main controller unit 200 controls the power-supply control unit 100 by a recovery signal 101 when it receives the energization request signal 610, and returns the power mode of the apparatus from the power-saving mode to a normal operation power mode. Also, the main controller unit 200 receives an input unit control signal 102 from the input unit 500. Also, though it is not described in detail, various hardware control circuits 201 are connected via the control bus 205. The CPU 204 comprehensively controls these based on a control program stored in the ROM 203.

<Power Control>

Figure 2:
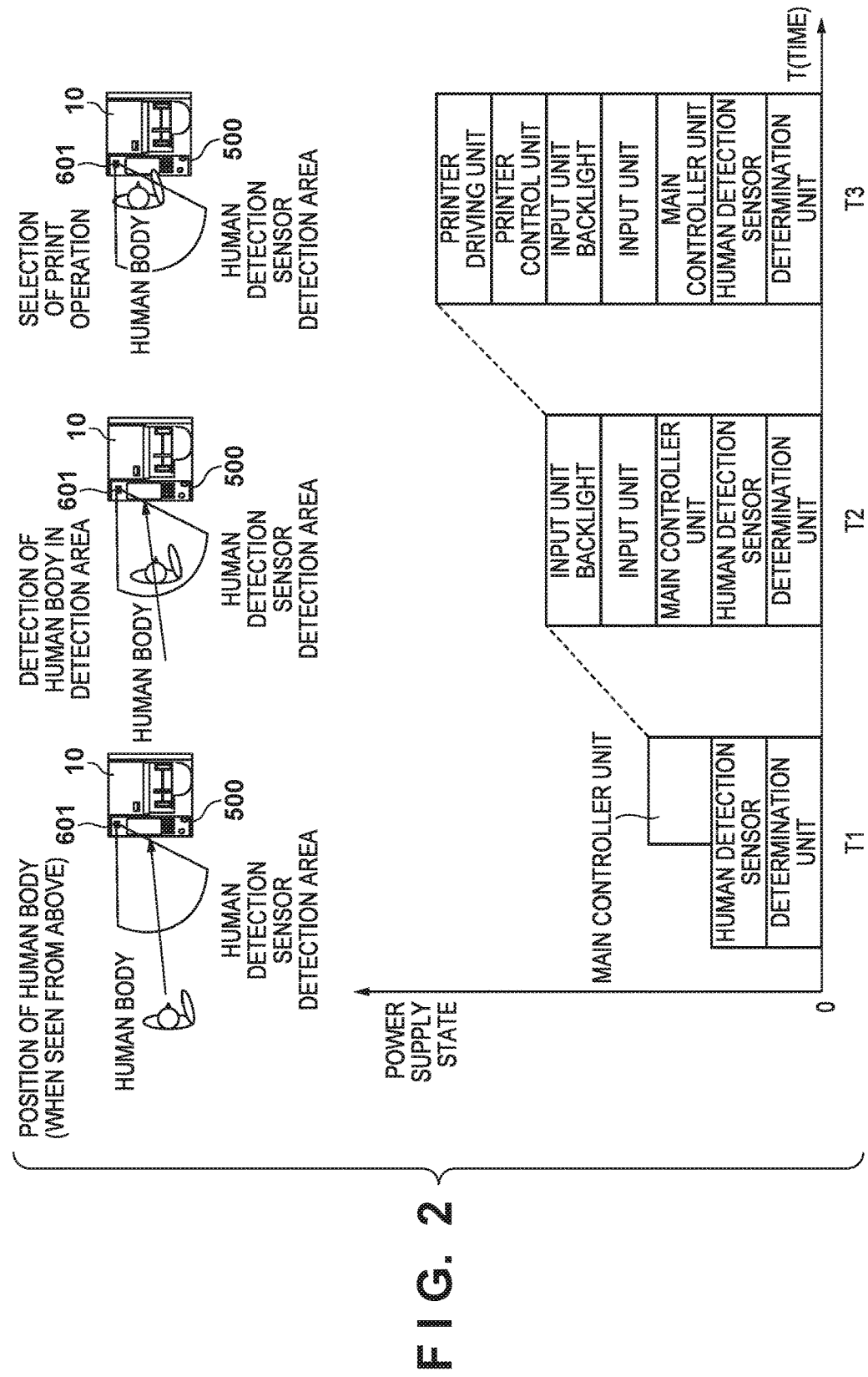
FIG. 2 is a view illustrating power control in accordance with a distance between the image processing apparatus and a human body according to an embodiment.

Next, with reference to FIG. 2, power control in accordance with the distance between the image processing apparatus 10 and a human body detected by the human detection sensor 601 will be described. The distance between the image processing apparatus 10 and the human body is indicated in the top part of the figure, and the power control states at those distances are represented in the bottom part of the figure. The human detection sensor 601 is positioned close to the input unit 500 as indicated in FIG. 2, and the detection area is indicated by a fan-shaped arc.

In the case where there is a large distance between the image processing apparatus 10 and the moving body at time T1, and the moving body is positioned outside of the detection area, the human detection sensor 601, the determination unit 603, and parts in the main controller unit 200 needed for control are energized as the power-saving mode. When a moving body enters into a detection area of the human detection sensor 601 at time T2, the main controller unit 200 as a whole is energized. Also, the input unit 500 and the input unit backlight are both energized. Additionally, when one item of a function menu displayed on the input unit 500 is selected at time T3, a target unit is energized. Here, a case where a print operation is selected is illustrated, and the printer driving unit 401 is being energized. In this way, the image processing apparatus 10 according to the present embodiment is performing power control in accordance with the situation and reducing unnecessary power consumption.

<Control Procedure>

Next, with reference to FIGS. 3A-3C, a control procedure for the power control described in FIG. 2 will be described. Processing described below is realized by the CPU 204 in the main controller unit 200, for example, reading a control program stored in the ROM 203 into the RAM 202, and executing the program. In the present embodiment, a case in which an ultrasonic sensor is being used as the human detection sensor 601 for moving body detection is being illustrated, but a pyroelectric sensor or an infrared array sensor may also be used.

Firstly, in step S301, the CPU 204 determines whether or not a person was detected based on output of the human detection sensor 601. Specifically, the CPU 204 determines whether or not the energization request signal 610 outputted from the determination unit 603 was received. When it is determined that the energization request signal 610 was received, step S302 is advanced to, and the CPU 204, by controlling the recovery signal 101, switches from power-saving mode energization (power-saving energization) in relation to the main controller unit 200 to energization (normal energization) in the normal operation power mode. Additionally, the CPU 204 inputs a power supply into the input unit 500 and the input unit backlight 501. Continuing on, in step S303, the CPU 204 turns off the power supply of the sensor unit 600. This is because it has been detected that a person is near, the power-saving mode has been returned from, and so the human detection sensor 601 is unnecessary, and therefore unnecessary power consumption is suppressed.

Next, in step S304, the CPU 204 resets (initializes) the number of operations (number of timings) of a later-described wait timer (timing unit). The number of operations of the wait timer is a number of restarts (timing again) after the wait timer has been reset. The number of operations is stored in a data storage area (RAM 202) in the main controller unit 200. The wait timer is an interval timer for detecting whether a person is present when, after returning from the power-saving mode, a power supply is next supplied to the sensor unit 600. The time of the interval is set in advance, and when the wait timer times the predetermined time period in a case where no input is performed after returning from the power-saving mode, it is detected whether or not a person is present by energizing the human detection sensor 601, and it is thereby determined whether to not to once again transit into the power-saving mode. Description will be given later, but the number of operations of the wait timer is also used as criteria for determining whether to transit into the power-saving mode once again. That is, a limit is put on the number of operations of the wait timer, and when exceeded, the power-saving mode is transited into.

Next, in step S305, the CPU 204 starts the wait timer, and starts counting. The wait timer may be implemented as a software counter that the CPU 204 executes in the main controller unit 200 or as a hardware counter in the control circuit 201. Continuing on, in step S306, the CPU 204, via the input unit control signal 102, determines whether or not the user inputted using the input unit 500. The CPU 204 advances to step S307 in a case where it determines that input was performed, and advances to step S308 when it determines that no input was performed.

Below, description is given of steps from step S307. From step S307 is control in a case where a person is detected by the sensor unit 600, and the person inputs so as to use the image processing apparatus 10. Also, configuration is such that power-supply control is performed for each function selected from a menu of the input unit screen. In step S307, the CPU 204 determines whether or not a copy operation is selected by a user. When it is determined that a copy operation is selected, step S309 is advanced to, and otherwise step S310 is advanced to. In step S309, the CPU 204 causes the printer control unit 400, the printer driving unit 401, the scanner control unit, and the scanner driving unit 301 to operate by energizing them, and step S314 is advanced to.

Meanwhile, in step S310, the CPU 204 determines whether or not a print operation is selected by a user. When it is determined that a print operation is selected, step S311 is advanced to, and otherwise step S312 is advanced to. In step S311, the CPU 204 causes the printer control unit 400 and the printer driving unit 401 to operate by energizing them, and step S314 is advanced to. Also, in step S312, the CPU 204 determines whether or not a scan operation is selected by a user. When it is determined that a scan operation is selected, step S313 is advanced to, and when another operation is selected, step S314 is advanced to. In step S313, the CPU 204 causes the scanner control unit 300 and the scanner driving unit 301 to operate by energizing them, and step S314 is advanced to.

In step S314, the CPU 204 was able to determine that an input by a user has occurred, and therefore the wait timer that started counting in step S305 is reset, and caused to stop. Continuing on, in step S315, the CPU 204 newly causes an auto-sleep timer to start. The auto-sleep timer may be implemented by a software counter according to the CPU 204 or by a hardware counter. The auto-sleep timer is reset every time the user performs an input on the input unit 500, and counting is started once again. In a case where subsequent input is not performed after input is performed, when a predetermined time period is timed by the auto-sleep timer, it is determined that the user left, and the power-saving mode is transited into. The time period of the above-described timing (interval time period) is set in advance for the auto-sleep timer by the user.

Next, in step S316, the CPU 204 determines whether or not the auto-sleep timer timed out. The CPU 204 advances to step S317 in a case where it determines that the timer has not timed out, and advances to step S318 when it determines that the timer has timed out. In step S317, the CPU 204 determines whether or not the user performed an input on the input unit 500 by the input unit control signal 102 from the input unit 500. The CPU 204 returns to step S316 once again in a case where it is determined that no user input has been detected, and advances to step S319 in a case where it determines that a user input was detected. In step S319, the CPU 204 resets the auto-sleep timer, returns the counter to an initial value, and returns to step S315. By these steps, configuration is such that so long as the user is inputting using the input unit 500, the power-saving mode is not automatically transited into.

Meanwhile, in a case where it is determined that the auto-sleep timer timed out, the CPU 204, in step S318, determines that the user left, turns on the power supply of the sensor unit 600, and determines whether or not it is possible to actually detect a person in step S320. The CPU 204 advances to step S330 in a case where it determines that no person was detected, and advances to step S326 when it determines that a person was detected. In step S330, the CPU 204 controls the recovery signal 101 to transit into the power-saving mode, and ends the processing.

Figure 8:
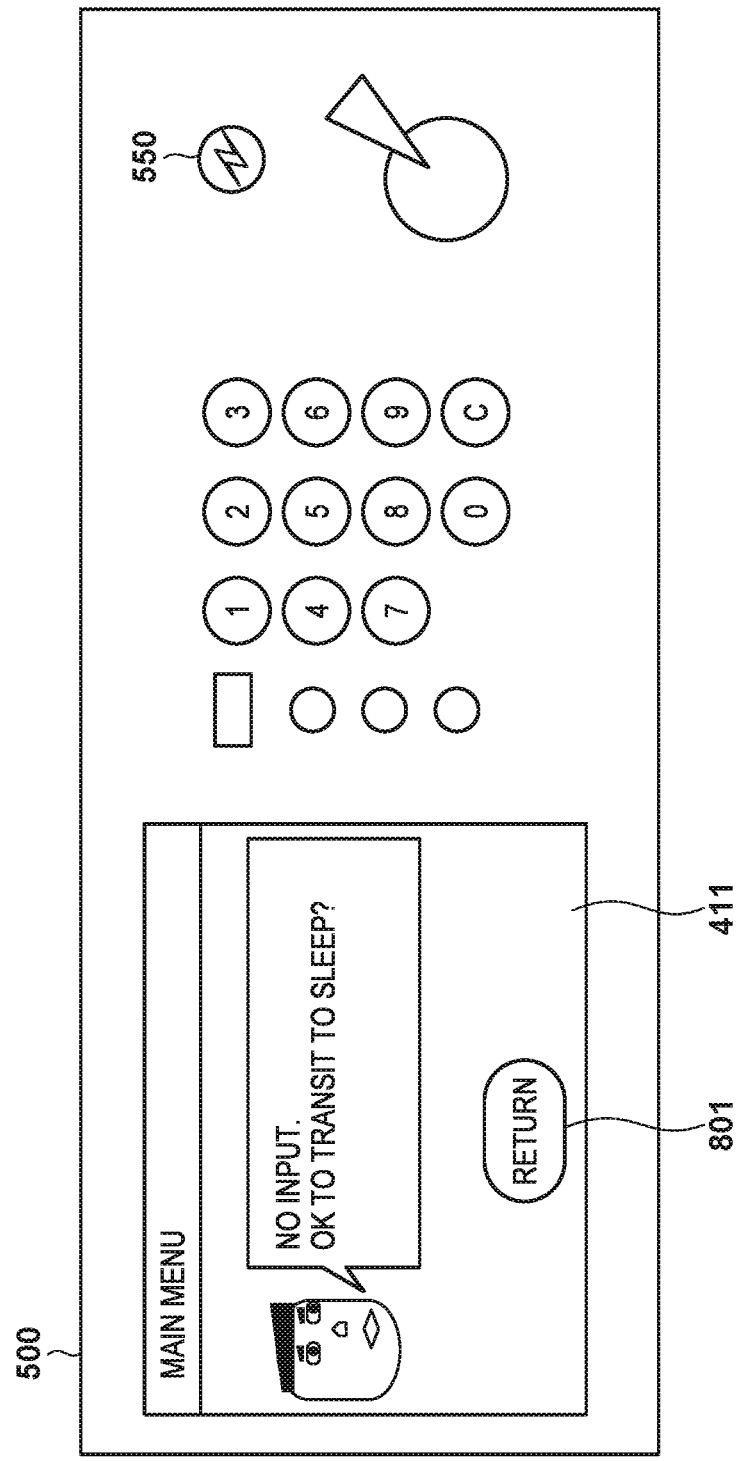
FIG. 8 is an example in which an alert is displayed on an input unit screen of the image processing apparatus according to an embodiment.

Meanwhile, in step S326, the CPU 204 issues an alert to the user. The alert prompts to user for input by audio synthesis by the audio speaker 502, and thereby notifies that the power-saving mode will be transited into. For example, the user is prompted to perform input by audio such as "No input has been performed. Is it OK to go to sleep?", and if there is no input, the power-saving mode is transited into. Also, configuration may be taken so as to simultaneously cause an image prompting for input to be displayed on the input unit 500. For example, as illustrated in FIG. 8, a screen reading, "No input has been performed. Is it OK to go to sleep?" including the return button 801 may also be displayed on a liquid crystal screen display unit 411. Configuration is such that the user returns to the previous screen by pressing a return button 801, in a case where the user intends to continue performing input.

Figure 3A:
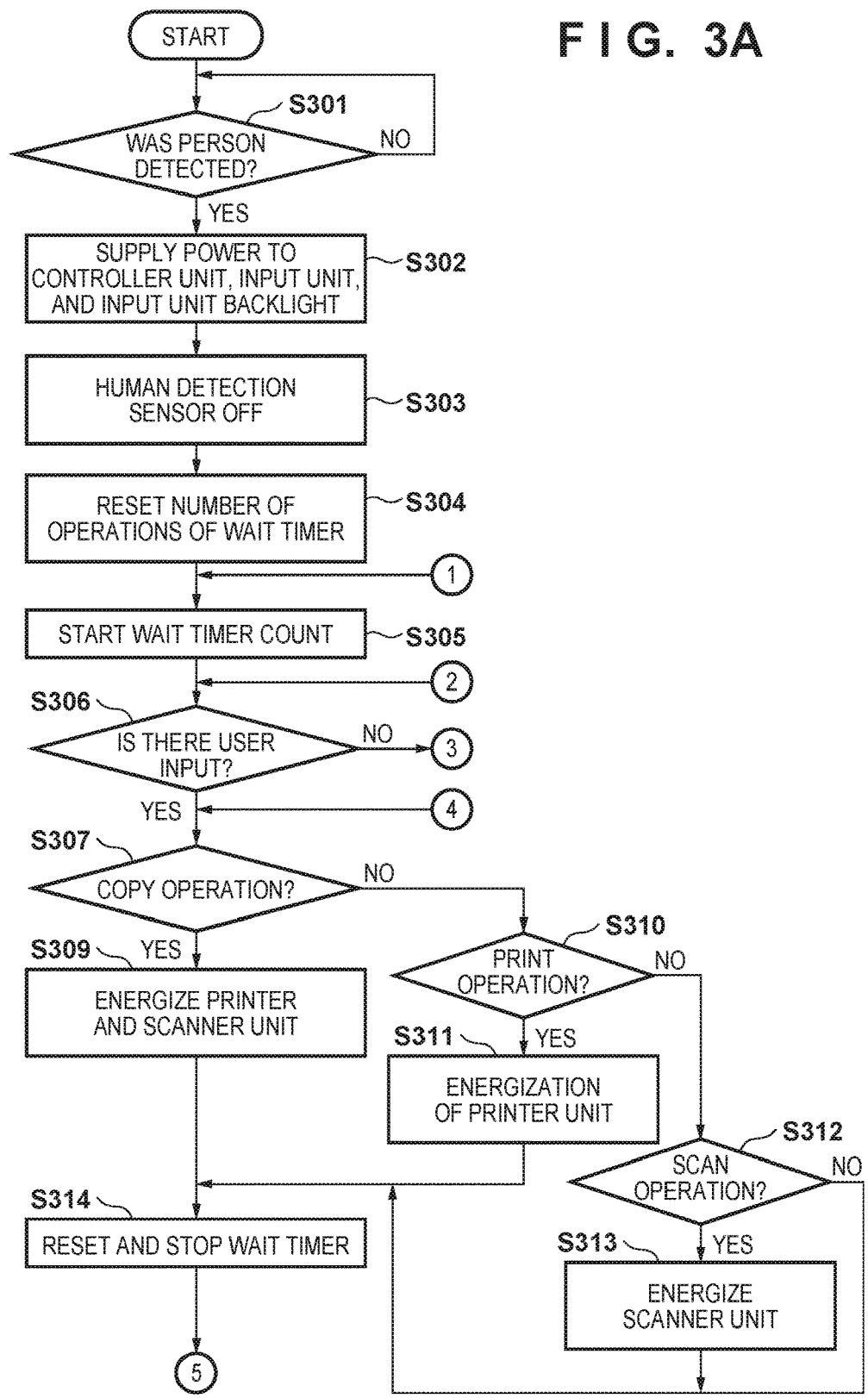
Figure 3B:
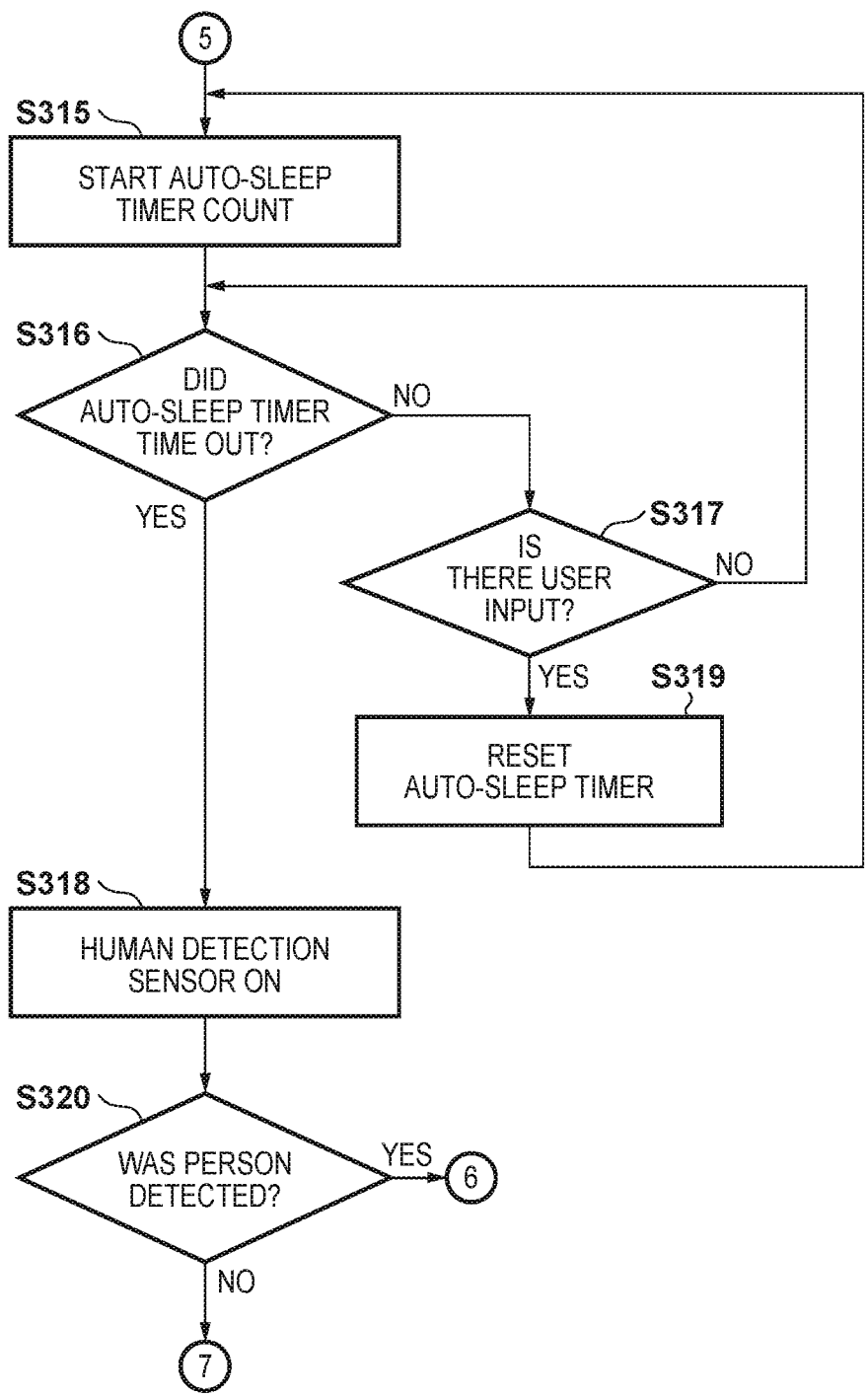

Description of FIGS. 3A-3C is returned to. When an alert is issued, the CPU 204, in step S327, starts the wait timer count. Subsequently, in step S328, the CPU 204 determines whether or not the user performed input on the input unit 500 by the input unit control signal 102 from the input unit 500. The CPU 204 returns to step S307 in a case where it determines that user input was detected, and continues the steps predicated on the fact that a person using the image processing apparatus 10 is beside the device. Meanwhile, in a case where the user determines that user input was not detected, step S329 is advanced to.

In step S329, the CPU 204 determines whether or not the wait timer which started counting in step S327 has timed out. The CPU 204 returns to step S328 and waits for user input in a case where it is determined not to have timed out. Meanwhile, in a case where it is determined to have timed out, it is determined that the user left and step S330 is advanced to. In step S330, the CPU 204 controls the recovery signal 101, transits to the power-saving mode, and ends the processing.

Below, description is given of steps from step S308. Specifically, from step S308 is control in a case where the user is detected by the sensor unit 600, but no input is performed by the user. In step S308, the CPU 204 determines whether or not the wait timer which started counting in step S305 has timed out. The CPU 204 returns to step S306 and waits for user input in a case where it is determined not to have timed out. Meanwhile, in a case where it is determined to have timed out, step S321 is advanced to. By these steps, user input is awaited while the wait timer operates.

Next, by the following steps, the power supply of the sensor unit 600 is turned on, and an operation for confirming whether it is possible to actually detect a person is executed.

That is, in step S321, the CPU 204 turns on the power supply of the sensor unit 600. Subsequently, the CPU 204, in step S322, determines whether or not a person can be detected by the energization request signal 610 from the sensor unit 600. In a case where the CPU 204 determines that a person was detected, step S323 is advanced to since the user is performing input. Meanwhile, in a case where it is determined that no person was detected, since the user left, step S330 is advanced to, the power-saving mode is transited into based on the previously described step, and the processing ends.

In step S323, the CPU 204 turns off the power supply of the sensor unit 600 temporarily. Then, the CPU 204, in step S324, counts the number of operations of the wait timer. The number of operations is stored in the data storage area of the CPU of the work RAM 202. In step S325, the CPU 204 performs a check by comparing against the number of operations set in advance. The CPU 204, in a case where it determines that the number of operations has not reached the predetermined number, advances to step S305, and executes a step for awaiting user input. Meanwhile, the CPU 204 advances to step S326 in a case where it determines that it matches the predetermined number.

The number of operations (the number of timings) of the wait timer indicates the number of times that the wait timer was started in a state in which even though a person was detected after transiting to the normal operation power mode, no input was performed. The threshold (predetermined number) for this number of times is set in advance, and a determination is made as to whether the person is a user who intends to perform input or some other user. In a case where a predetermined number of operations have been performed, step S326 is advanced to, and steps described previously are executed.

In the above-described flow, the power supply is turned on for the sensor unit 600 and is turned off for everything else in the step in which the user is detected. However, the present invention is not limited to this, and for example, configuration may be taken so as to keep the power supply to the sensor unit 600 on at all times, and to receive the energization request signal 610 in the step for detecting the user, and to mask the energization request signal 610 in the main controller unit 200 in the other steps.

<Power-Supply Control Configuration>

Figure 4:
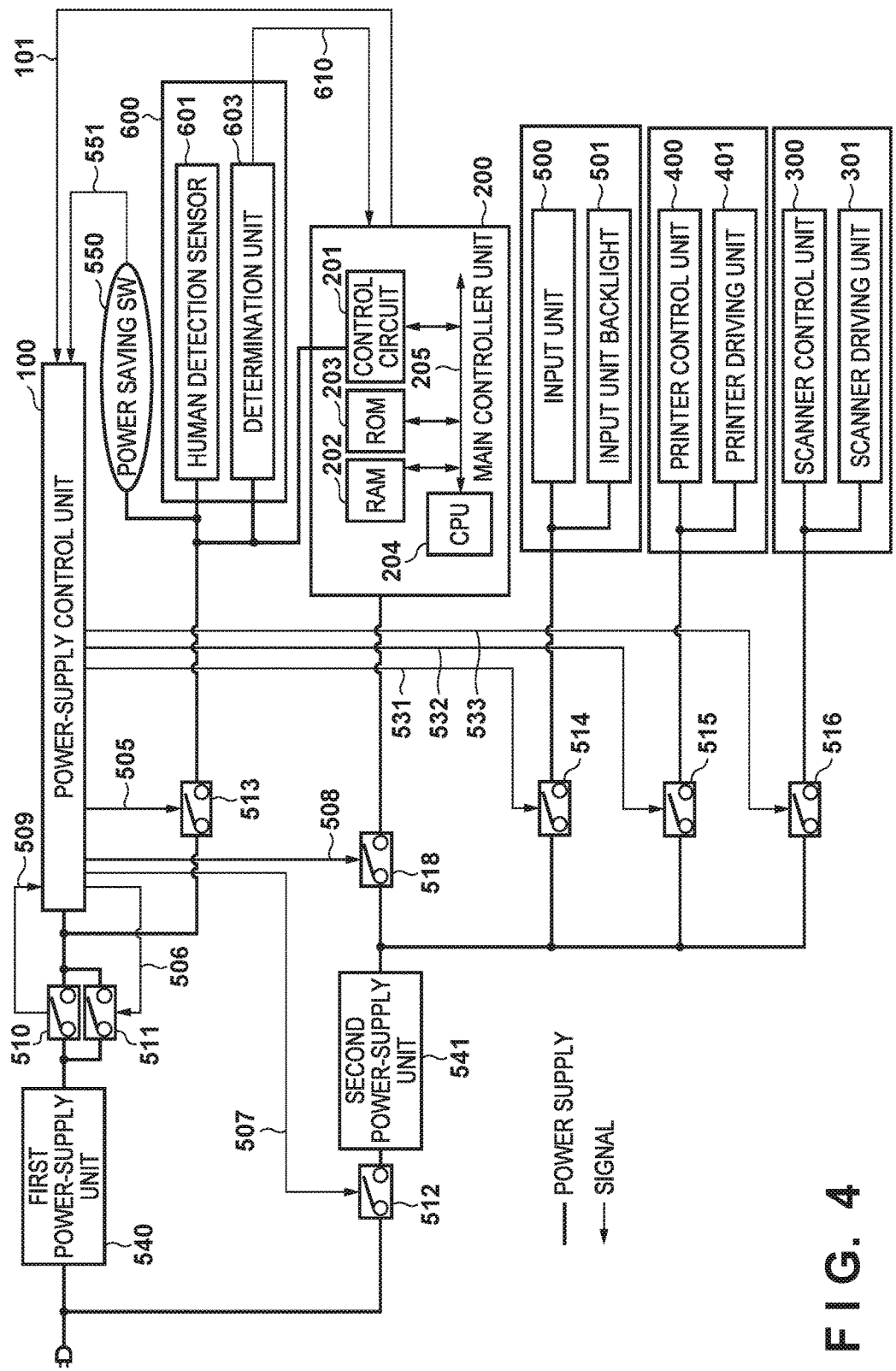
FIG. 4 is a view that illustrates a power-supply system of the image processing apparatus according to an embodiment.

Next, with reference to FIG. 4, a hardware configuration (power-supply system) related to power-supply control of the main controller unit 200, the scanner control unit 300, and the printer control unit 400 is described. The power-supply control unit 100 controls power-supply control for when activating and when powering off, and changes in the power-supply state in accordance with the foregoing power control of transiting into/returning from the power-saving mode. Specifically, power-supply control for when transiting to the normal operation power mode is performed in accordance with various reasons for returning from the power-saving mode. The reasons for returning are not a main element of the invention and so detailed description is omitted. By setting, by the main controller unit 200, the reason for returning from the power-saving mode prior to transiting to the power-saving mode, it is possible to change the reason for return.

The power-supply control unit 100 receives commands from the main controller unit 200 or the recovery signal 101 for recovering from the power-saving mode from a power saving SW 550. Also, by these commands, it is controlled whether or not to supply power to each apparatus from a first power-supply unit 540 and a second power-supply unit 541.

Note FIG. 4 illustrates a power supply state of the normal operation power mode, and the state is such that power is being supplied to all loads.

Control signals 505, 506, 507, 508, 509, 531, 532, and 533 are signals for controlling whether or not to supply power to each device. Also, switches 510, 511, 512, 513, 514, 515, 516, and 518 are switches controlled by the control signals 505, 506, 507, 508, 509, 531, 532, and 533. By controlling the control signals 505, 506, 507, 508, 509, 531, 532, and 533, it becomes possible to change the state of power supply to each device.

The switches 511, 512, 513, 514, 515, 516, and 518 can be realized by an FET and a relay switch or the like. The control signal 506 and the switch 511 control supply of power from the first power-supply unit 540 to the sensor unit 600 and the power-supply control unit 100. When the later-described switch 510 is turned on, the power-supply control unit 100 drives the control signal 506 and the switch 511 is turned on thereby. Accordingly, even when the user turns off the switch 510, power can be supplied to the sensor unit 600 and the power-supply control unit 100.

At that time, by the signal 509 which is for obtaining whether the switch is on or off, the power-supply control unit 100 detects that the switch 510 is turned off, and notifies that to the main controller unit 200. By receiving this notification, it becomes possible to turn off the power supply to each device after performing normal shutdown processing. The switch 510 is a switch for a user to turn on or off the power supply to the image processing apparatus 10, and by the user turning on the switch 510, power is supplied to the sensor unit 600 and the power-supply control unit 100 from the first power-supply unit 540.

The control signal 507 and the switch 512 control supply of AC power to the second power-supply unit 541. The control signal 507 and the switch 512 control supply of a second power supply to each device. For example, to describe supply of power to the main controller unit 200, in the case of the power-saving mode, the switch 512 is turned off, and power supply is stopped, but at the time of the normal operation power mode, the switch 512 is turned on, and power is supplied from the second power-supply unit 541.

The first power-supply unit 540 converts from AC to DC, and supplies a first power supply to the power-supply control unit 100 and the like. The first power supply supplied from the first power-supply unit 540 is a power supply that is provided to supply power to the power-supply control unit 100 and the control circuit 201 in the main controller unit 200 even in a case where the image processing apparatus 10 is put in the power-saving mode. The first power supply is supplied to the sensor unit 600 in addition to the power-supply control unit 100 in order to return from the power-saving mode.

The second power-supply unit 541 converts from AC to DC, and supplies a second power supply to each device. The second power supply supplied from the second power-supply unit 541 is a power supply that the image processing apparatus 10 stops when in the power-saving mode. The second power-supply unit 541 comprises a function for disconnecting the supply of power to each type of device for which power supply is unnecessary in the case of the power-saving mode.

The power saving SW (switch) 550 described below is a switch by which a user performs input, and it is pressed to cause the image processing apparatus 10 to transit into the power-saving mode or to return from the power-saving mode to the standby state. In a case where the power saving SW 550 is pressed when in the normal operation power mode state, the main controller unit 200 detects that the power saving SW 550 was pressed, and performs processing for transiting into the power-saving mode. Also, in a case where the power saving SW 550 is pressed when in the power-saving mode, the power-supply control unit 100 detects that the power saving SW 550 is pressed, and starts energization in relation to each device such as the main controller unit 200.

As in time T3 of FIG. 2, in a case where a print operation is selected from the menu displayed on the liquid crystal screen display unit 411 of the input unit, the power-supply control unit 100 turns off the switch 516 by the signal 533, and causes energization to the scanner control unit 300 and the scanner driving unit 301 to stop. Furthermore, the power-supply control unit 100 turns on the switches 514 and 514 by the signals 531 and 532, and in a state in which the scanner control unit 300 and the scanner driving unit 301 are stopped, performs control to cause the input unit 500 and a print operation to operate.

<Configuration of Input Unit>

Figure 5:
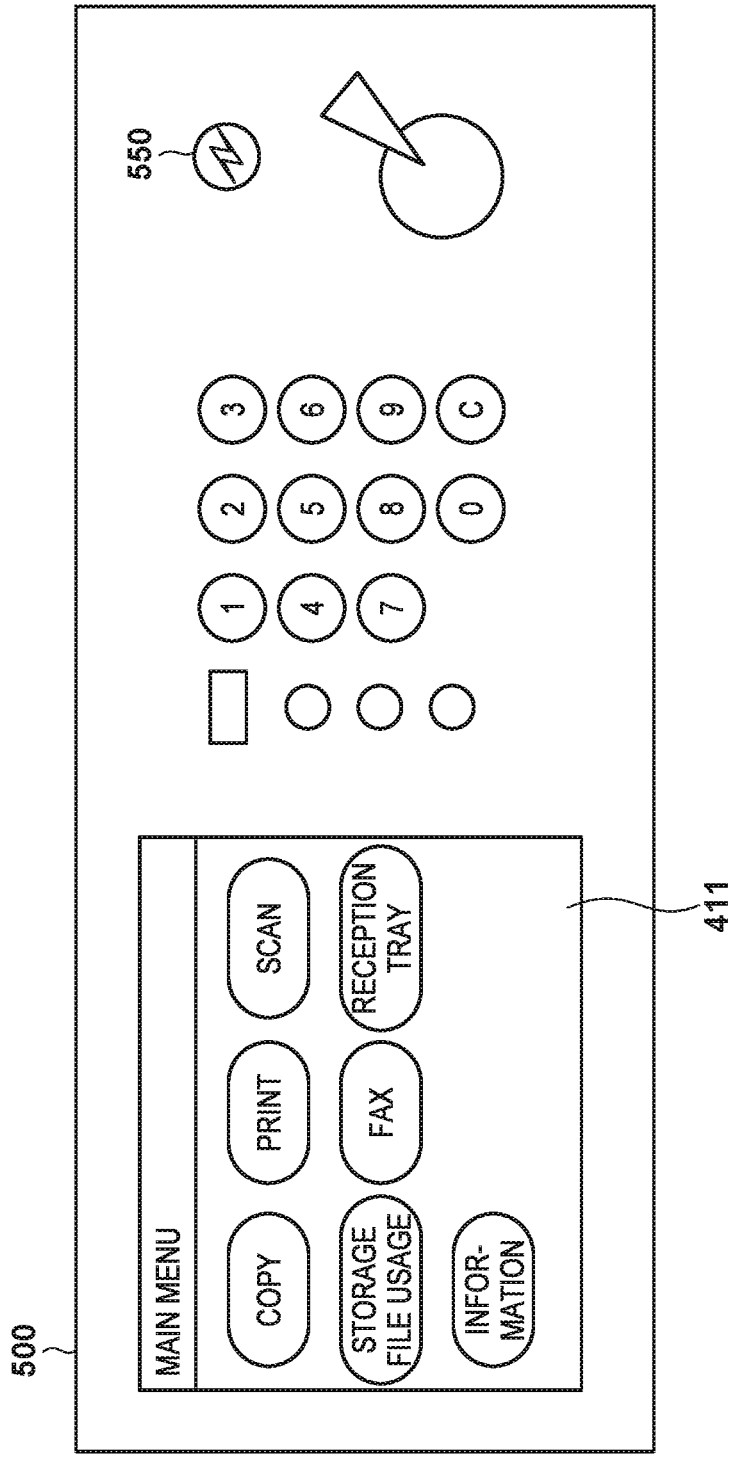
FIG. 5 is a view that illustrates an example in which an input unit screen of the image processing apparatus is displayed according to an embodiment.

Next, with reference to FIG. 5, the configuration of the input unit 500 will be described. In FIG. 5, functions displayed on a liquid crystal display unit 411 of the input unit 500 of step S306 of FIG. 3A are illustrated. The user can cause operations of each function to be executed by selecting and pressing a required function from the display screen displayed on the liquid crystal display unit 411. Note that the power saving SW 550 is also provided on the input unit 500, and as described above, when pressed, the power-saving mode is transited into.

<Power Supply State>

Next, with reference to FIG. 6 and FIG. 7, the power supply state in the hardware configuration described with reference to FIG. 4 will be described. As described above, FIG. 4 illustrates a power supply state in which power is being supplied to all devices in the normal operation power mode.

Figure 6:
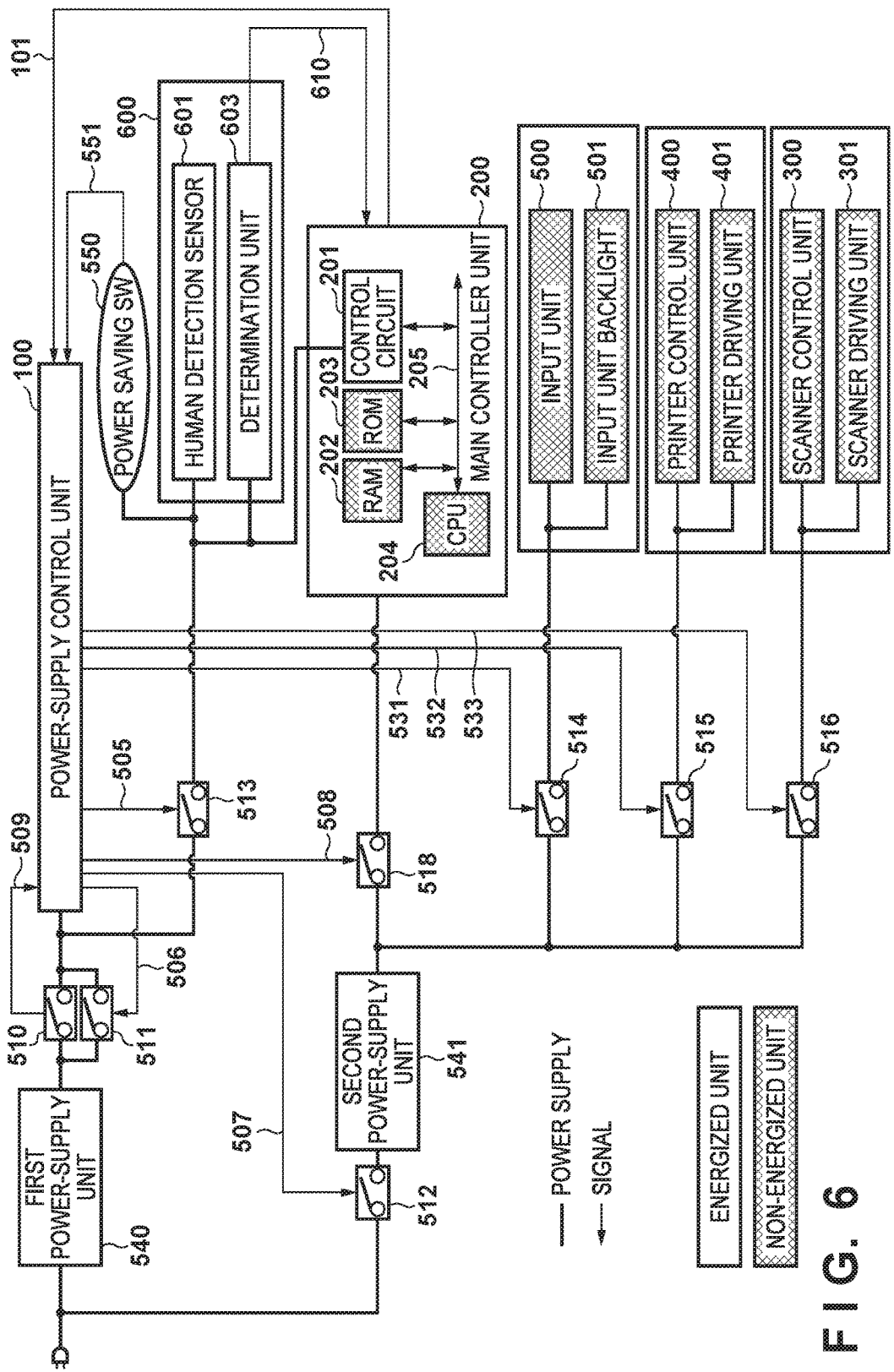
FIG. 6 is a view illustrating a state of energization when power saving in the image processing apparatus according to an embodiment.

FIG. 6 illustrates a power supply state of the power-saving mode (step S330). Specifically, as illustrated in FIG. 6, the units to which power is supplied are the power-supply control unit 100, the sensor unit 600, and the power saving SW 550. Furthermore, power is supplied to the control circuit 201 in the main controller unit 200. Accordingly, in FIG. 6, the switches 510, 511, and 513 are controlled to be on. Configuration is such that the energization request signal 610 from the sensor unit 600 is outputted as the recovery signal 101 via the control circuit 201 in the main controller unit 200. When returning to the normal operation power mode, these signals can be detected from the CPU 204, and control can be performed.

Figure 7:
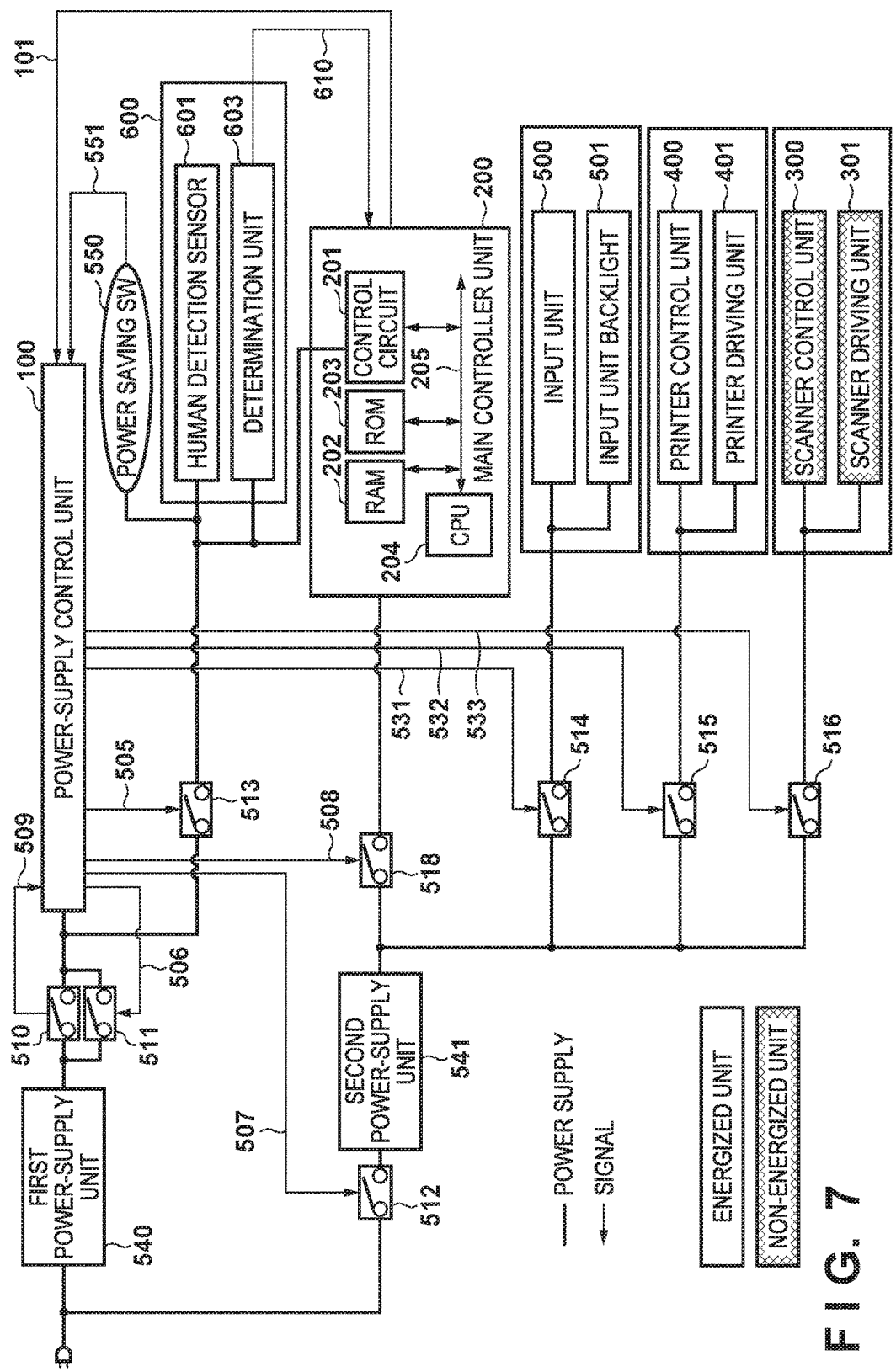
FIG. 7 is a view illustrating a state of energization when printing in the image processing apparatus according to an embodiment.

FIG. 7 illustrates a power supply state when a print operation is selected (step S311) in the flowchart of FIG. 3A. Because a print operation has been selected, power is supplied to the printer control unit 400 and the printer driving unit 401 which are units necessary for the operation. Accordingly, in FIG. 7, in addition to the switches 510, 511, and 513 illustrated in FIG. 6 being controlled to be on, the switches 512, 514, 515, and 518 are further controlled to be on. Note that the switch 516 is a switch related to scanner operation and is therefore left off. Also, at this stage, supply of power to the sensor unit 600 may be stopped. This is because at this stage, user input has been received, and no detection of a person has been made by the human detection sensor 601.

<Power Control Upon Respective User Input>

Figure 9:
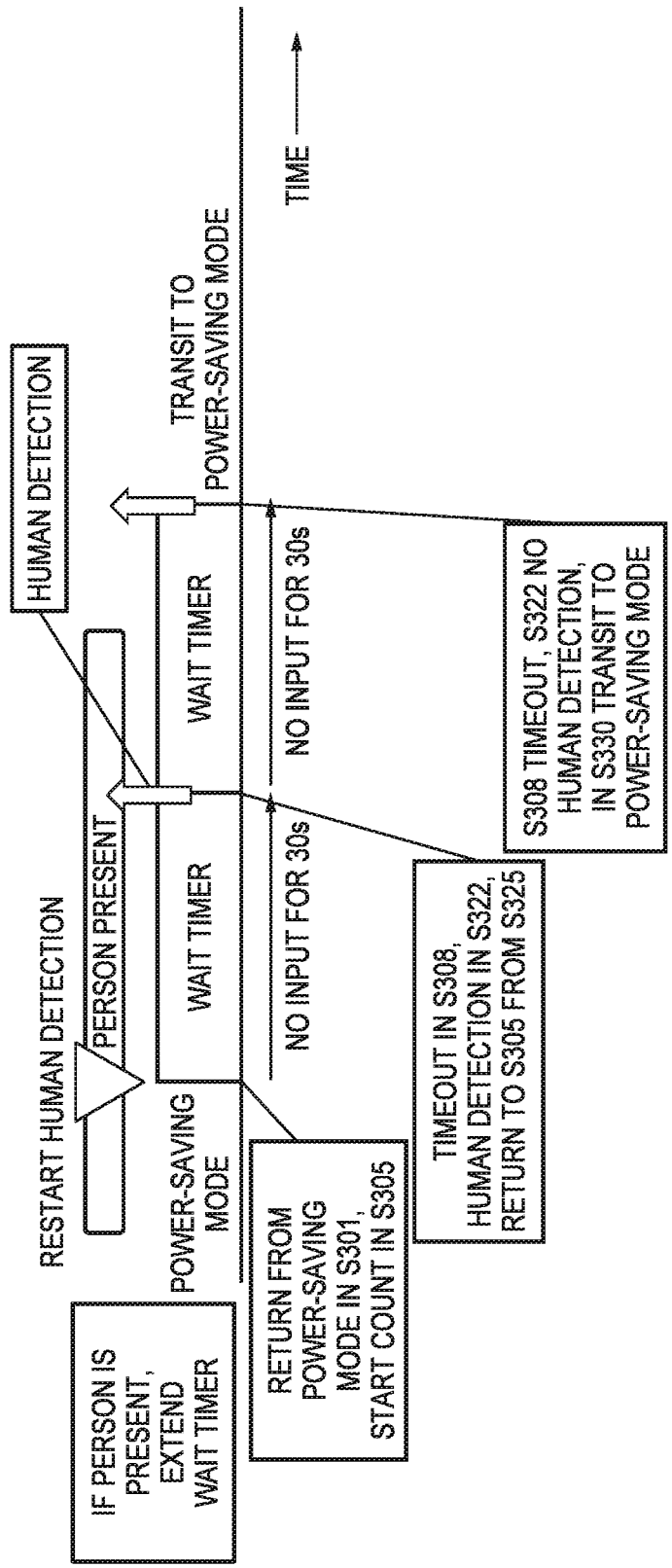
FIG. 9 is a view for describing a case in which after a person is detected by the image processing apparatus, a state in which there is no input continues and then the person leaves according to an embodiment.

Below, with reference to FIG. 9 through FIG. 12 and FIGS. 3A-3C, power control in accordance with envisioned cases of user input is described. FIG. 9 is a view for describing a case in which after returning from the power-saving state when a person is detected, a state in which no input is performed continues, and then the person leaves. The abscissa indicates the passage of time. Here, description is given of a case in which when the wait timer times out, the human detection sensor 601 is energized, and detection of a person is performed, and then the user moves away from the apparatus prior to the threshold for the number of operations of the wait timer being exceeded. For example, a case in which the time-out period of the wait timer which is of determination condition of the CPU 204 is 30 seconds (branching condition of step S308), and the number of operations of the wait timer is set at two times (branching condition of step S325) is envisioned. Note that configuration may be taken such that the time-out period of the wait timer, the threshold of the number of operations, and the time-out period of the auto-sleep timer are set by the user, and configuration may be taken to use predetermined values.

A person is detected by the human detection sensor 601, the power-saving mode is returned from, power supply to each unit is started, and counting of the wait timer is started (detection in step S301, count start in step S305). Upon a timeout when there is no input during counting (during timing) by the wait timer, the human detection sensor 601 is once again operated to detect a person (timeout in step S308, detection of a person in step S322). In a case where a person is detected and the number of operations of the wait timer has not reached the predetermined number, the wait timer is reset, and the count is started once again (return from step S325 to step S305).

In a case where there is no input during counting of the wait timer the second time, and furthermore the person moved away from the image processing apparatus 10, and after the second timeout, no person is detected by the human detection sensor 601 (timeout in step S308, no detection of a person in step S322). When the person is not detected, the power-saving mode is transited into (step S330). In this way, the wait timer is caused to operate, and controlled to wait for user input for a fixed time period. Note that the human detection sensor 601 is not continuously energized; it is not energized during wait timer counting, and it is energized when the wait timer times out and then person detection is performed. Accordingly, it is possible to reduce unnecessary power consumption more.

Figure 10:
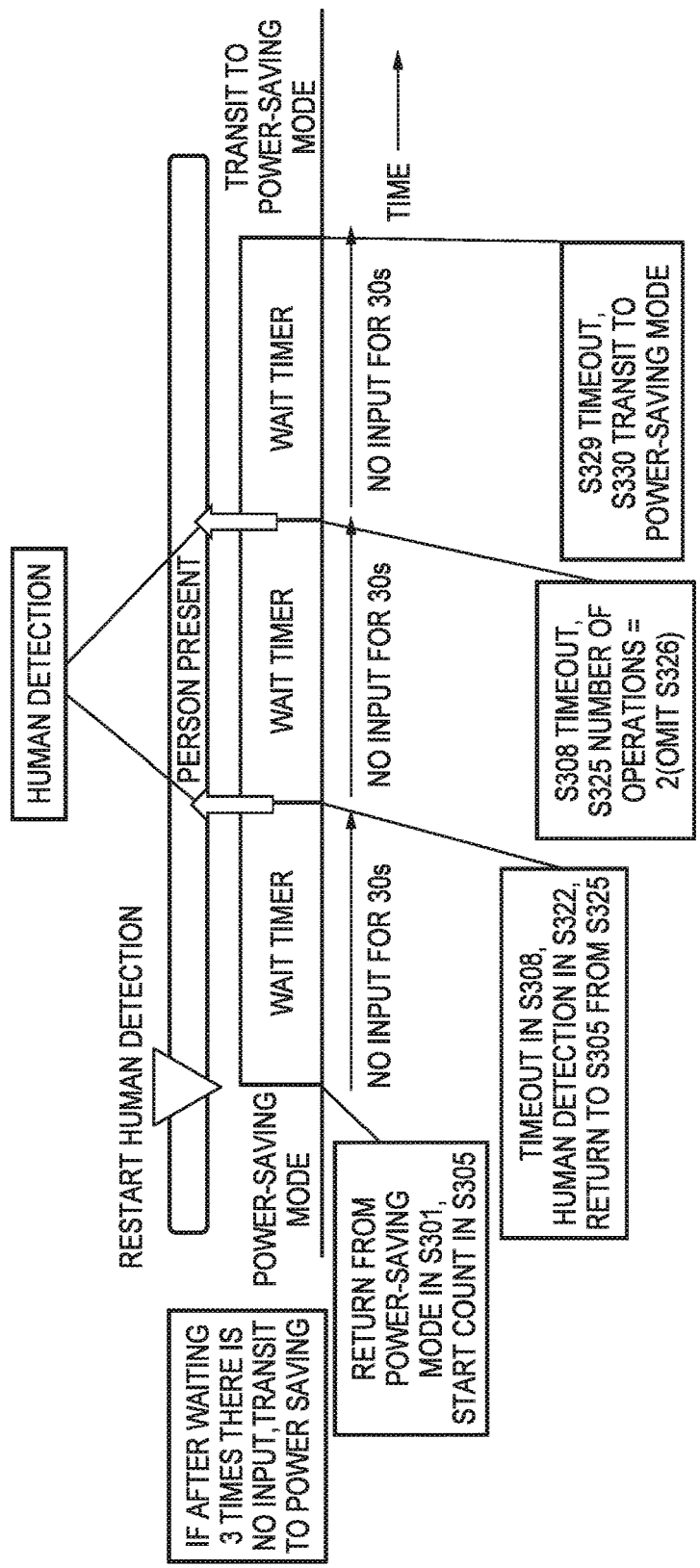
FIG. 10 is a view for describing a case where there is no input from the user while a person is detected by the image processing apparatus according to an embodiment.

FIG. 10 is a view for describing a case where a person is detected but there is no input from the user. The abscissa indicates the passage of time. Here, description is given of a case where after returning upon detection of a person, a state in which there is no input continues, and the threshold of the number of operations of the wait timer is exceeded. For example, a case in which the time-out period of the wait timer is 30 seconds (branching condition of step S308), and the number of operations of the wait timer is set at two times (branching condition of step S325) is envisioned.

A person is detected by the human detection sensor 601, the power-saving mode is returned from, power supply to each unit is started, and counting of the wait timer is started (detection in step S301, count start in step S305). Upon a timeout when there is no input during counting (during timing) by the wait timer, the human detection sensor 601 is once again operated to detect a person (timeout in step S308, detection of a person in step S322). In a case where a person is detected and the number of operations of the wait timer has not reached the predetermined number, the wait timer is reset, and the count is started once again (return from step S325 to step S305).

Furthermore, upon a timeout when there is no input during counting by the wait timer the second time, the human detection sensor 601 is once again operated to detect a person (timeout in step S308, detection of a person in step S322). In a case where a person is detected, the number of operations of the wait timer is counted (step S324). At this time, since the number of operations of the wait timer is two times (threshold) (branching condition of step S325), final (third) counting by the wait timer is started (step S327).

If there is no input during the final (third) counting by the wait timer, the power-saving mode is transited into (step S330) upon a timeout (step S328, step S329). In this way, the wait timer is caused to operate a predetermined number of times, and to wait for user input for a fixed time period. If the wait timer is allowed to operate more than the predetermined number of times, and yet there is no input, the power-saving mode is transited into. In this way, by arranging a threshold for the number of operations of the wait timer, control is adjusted to suppress unnecessary power consumption as much as possible while avoiding transiting into the power-saving mode when input will be performed after a fixed time period has elapsed such as when the user is wavering over performing input.

Figure 11:
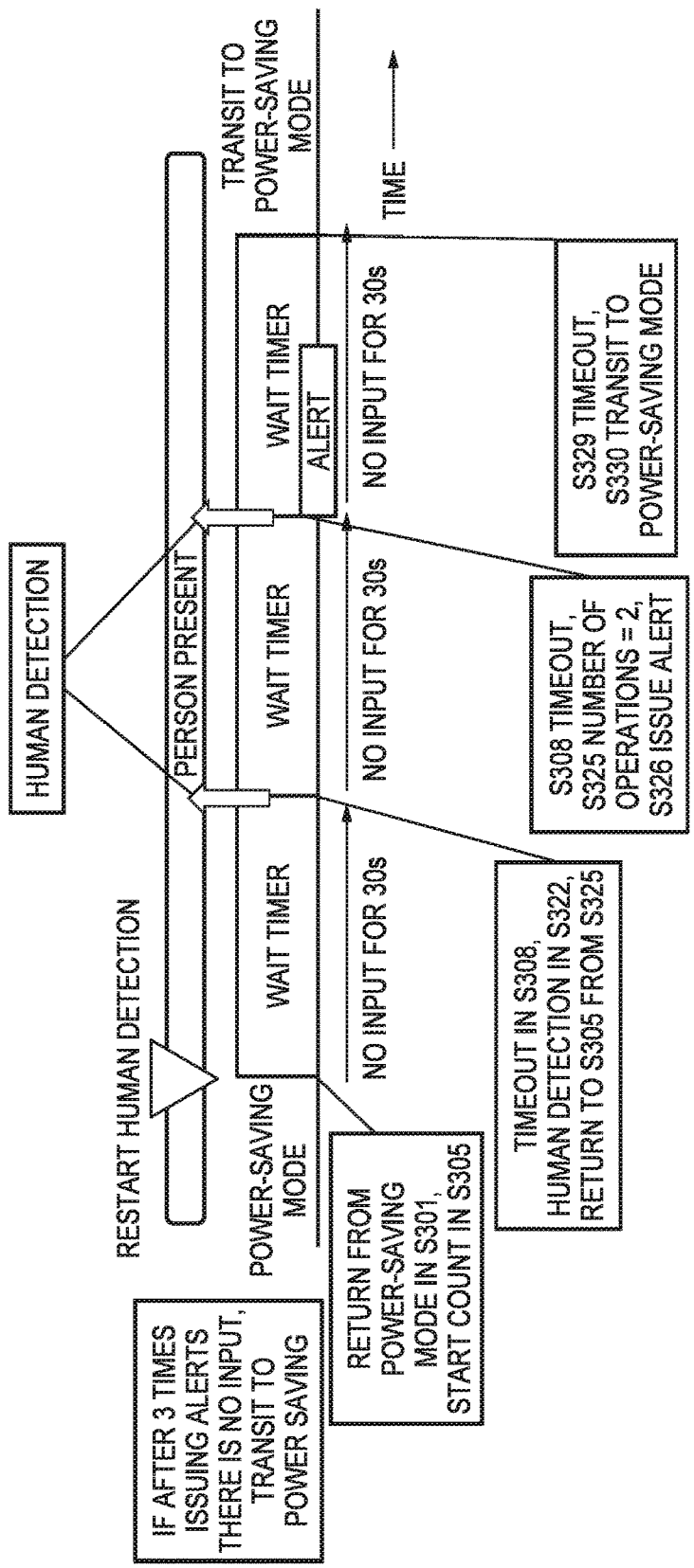
FIG. 11 is a view for describing an alert issued by the image processing apparatus according to an embodiment.

FIG. 11 is a view for describing alert issuance. The abscissa indicates the passage of time. Here, description is given of a case where an alert is issued when after returning upon detection of a person, a state in which there is no input continues, and the threshold of the number of operations of the wait timer is exceeded. For example, a case in which the time-out period of the wait timer is 30 seconds (branching condition of step S308), and the number of operations of the wait timer is set at two times (branching condition of step S325) is envisioned.

A person is detected by the human detection sensor 601, the power-saving mode is returned from, power supply to each unit is started, and counting of the wait timer is started (detection in step S301, count start in step S305). Upon a timeout when there is no input during counting (during timing) by the wait timer, the human detection sensor 601 is once again operated to detect a person (timeout in step S308, detection of a person in step S322). In a case where a person is detected and the number of operations of the wait timer has not reached the predetermined number, the wait timer is reset, and the count is started once again (return from step S325 to step S305).

Furthermore, upon a timeout when there is no input during counting by the wait timer the second time, the human detection sensor 601 is once again operated to detect a person (timeout in step S308, detection of a person in step S322). In a case where a person is detected, the number of operations of the wait timer is counted (step S324). At this time, since the number of operations of the wait timer is two times (threshold) (branching condition of step S325), an alert is issued (step S326), and final (third) counting by the wait timer is started (step S327).

An alert, as described above, the user is prompted to perform input by at least one of audio synthesis by the audio speaker 502 and display to the input unit 500, and thereby notification is given that the power-saving mode will be transited into if there is no input. For example, the user is prompted to input by an audio notification of "No input has been performed. Is it OK to go to sleep?", and if there is no input, the power-saving mode is transited into. As illustrated in FIG. 8, configuration may be taken so as to simultaneously display an image on the input unit 500. Configuration is such that the user returns to the previous screen by pressing the return button 801, in a case where the user intends to continue performing input.

If there is no input during the final (third) counting by the wait timer, the power-saving mode is transited into (step S330) upon a timeout (step S328, step S329). In this way, the wait timer is caused to operate the predetermined number of times, and an alert is issued when the wait timer is caused to operate more than the predetermined number of times, and the power-saving mode is transited into if, in spite of that, there is no input from the user over a fixed time period. Accordingly, compared to the case of FIG. 10, it is possible to perform control that is more considerate of user convenience.

FIG. 12 is a view for describing a case where after returning upon detection of a person, input is performed by the user, and thereafter a state in which no input is performed continues. The abscissa indicates the passage of time. Here, a case in which control combines the wait timer and the auto-sleep timer is described. The auto-sleep timer is a timer that measures a time period for next transiting into the power-saving mode when a state in which no input is performed continues after user input. Configuration is such that it is possible to make the setting in advance by selecting between 10 seconds and 4 hours. For example, assume 60 seconds has been set.

A person is detected by the human detection sensor 601, the power-saving mode is returned from, power supply to each unit is started, and counting of the wait timer is started (detection in step S301, count start in step S305). Here, input is performed prior to the wait timer timing out, and by the input screen illustrated in FIG. 5, the user selects and activates the function they wish to use. For example, when the copy operation is selected, the printer control unit 400, the printer driving unit 401, the scanner control unit 300, and the scanner driving unit 301 are energized (step S306, step S307, step S309).

After executing a copy job, the auto-sleep timer count is started, and input from the user is awaited for 60 seconds (step S315, step S316, step S317). In a case where there is no input, the human detection sensor is turned on, and an alert is issued in a case where a person is detected (step S318, step S320, step S326). After that the wait timer count is started, and input from the user prompted by the alert is awaited (step S327, step S328). In a case where the wait timer timed out, the power-saving mode is transited into (step S329, step S330).

In this way, when the user performs input within the predetermined number of times of the wait timer and thereby executes a job, the auto-sleep timer count is started thereafter, and when it times out without any input, an alert is issued and the wait timer is started. After that, the power-saving mode is transited into when the wait timer times out without input. Accordingly, for power saving control after input is performed, it is possible to suppress unnecessary power consumption as much as possible and perform control that is considerate of user convenience. Note that in FIG. 12 is illustrated control in which an alert is issued after the auto-sleep timer times out, and then timing by the wait timer is started, and the power-saving mode is transited into when the wait timer times out. However, the present invention is not limited to this, and, for example, configuration may be taken so as reset the number of operations (the number of timings) of the wait timer when the auto-sleep timer is started. In such a case, control of any of FIG. 9 through FIG. 11 may be performed as the power control thereafter.

As described above, the information processing apparatus (image processing apparatus) according to the present embodiment has, as operation modes, a normal operation power mode (first power mode) and a power-saving mode (second power mode) in which power consumption is less than that of the normal operation power mode. Also, when the information processing apparatus detects an object positioned in the vicinity of the information processing apparatus, it starts timing of a predetermined time period, and causes the operation mode to return from the second power mode to the first power mode. When the predetermined time period is timed thereafter, the information processing apparatus causes the operation mode to transit from the first power mode to the second power mode if no object is detected by the human detection sensor. Meanwhile, if an object is detected by the human detection sensor, timing of the predetermined time period is performed once again. Also, configuration may be taken such that when the information processing apparatus causes the operation mode to return from the second power mode to the first power mode, it stops the supply of power to the human detection sensor, and then after the predetermined time period elapses it supplies power to the human detection sensor and performs detection. In this way, by virtue of the present embodiment, it is possible to avoid transiting to a power-saving mode when the user would not desire it by detecting the person by the human detection sensor once again after a fixed time period has elapsed, and it is possible to suppress unnecessary power consumption as much as possible.

Also, the information processing apparatus according to the present embodiment, even if there is a case where a person is detected by the human detection sensor once again after the fixed time period has elapsed, control is performed to transit into the power-saving mode if the number of timings (the number of operations) by the wait timer exceeds the threshold. Note that configuration may be taken such that at this time, an alert as described above is issued by at least one of audio output and display output when the number of timings by the wait timer reaches the threshold.

Also, the information processing apparatus according to the present embodiment causes timing of the predetermined time period (second predetermined time period) by the auto-sleep timer (second timing unit) after executing corresponding processing when user input is received during timing by the timer. After that, the information processing apparatus causes timing of the predetermined time period by the wait timer to start once again when the auto-sleep timer times out. Configuration may be taken so that at this time, an alert is issued, and the power-saving mode is transited into when the wait timer times out.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-247011 filed on Dec. 20, 2016, which is hereby incorporated by reference herein in its entirety.

What is claimed is:

1. An information processing apparatus comprising:
a human sensor;
an interface that receives a user operation; and
a power controller configured to, based on a sensing result of the human sensor, turn on a predetermined device;
wherein the power controller turns on the predetermined device and turns off the human sensor based on the sensing result of the human sensor, and the power controller turns on the human sensor and turns off the predetermined device based on a sensing result of the human sensor, when a predetermined time has elapsed without the interface receiving a user operation.

2. The information processing apparatus according to claim 1, wherein the power controller turns off the predetermined device in a case where the sensing result of the human sensor indicates no person.

3. The information processing apparatus according to claim 1, wherein the power controller turns off the human sensor based on a sensing result of the human sensor turned on by the power controller.

4. The information processing apparatus according to claim 3, wherein the power controller turns off the predetermined device in a case where an elapsed number of the predetermined time period exceeds a threshold.

5. The information processing apparatus according to claim 3, further comprising: a notification unit configured to notify an alert when an elapsed number of the predetermined time period reaches a threshold.

6. The information processing apparatus according to claim 5, wherein the notification unit, by at least one of audio output and display output, notifies the alert.

7. The information processing apparatus according to claim 1, wherein the predetermined device is a backlight of a display unit.

8. The information processing apparatus according to claim 6, wherein the notification unit notifies that the information processing apparatus will transit into a sleep mode as the alert.

9. The information processing apparatus according to claim 1, wherein the human sensor is an ultrasonic sensor, a pyroelectric sensor, or an infrared array sensor having a fixed detection range.

10. A method of controlling an information processing apparatus having a human sensor and an interface that receives a user operation, the method comprising:
based on a sensing result of the human sensor, turning on a predetermined device and turning off the human sensor, and
turning on the human sensor and turning off the predetermined device based on a sensing result of the human sensor, when a predetermined time has elapsed without the interface receiving a user operation.

11. A non-transitory computer-readable storage medium storing a computer program for causing a computer to execute each step of a method of controlling an information processing apparatus having a human sensor and an interface that receives a user operation, the method comprising:
based on a sensing result of the human sensor, turning on a predetermined device and turning off the human sensor, and
turning on the human sensor and turning off the predetermined device based on a sensing result of the human sensor, when a predetermined time has elapsed without the interface receiving a user operation.

* * * * *